United States Patent
Qin et al.

(10) Patent No.: US 10,559,798 B2
(45) Date of Patent: Feb. 11, 2020

(54) BATTERY MODULE

(71) Applicant: Contemporary Amperex Technology Co., Limited, Ningde, Fujian (CN)

(72) Inventors: Feng Qin, Ningde (CN); Zhi Wang, Ningde (CN); Lin Ma, Ningde (CN); Hua Zhang, Ningde (CN); Zhiyi You, Ningde (CN); Runyong He, Ningde (CN)

(73) Assignee: Contemporary Amperex Technology Co., Limited, Ningde (CN)

( * ) Notice: Subject to any disclaimer, the term of this patent is extended or adjusted under 35 U.S.C. 154(b) by 46 days.

(21) Appl. No.: 16/118,460

(22) Filed: Aug. 31, 2018

(65) Prior Publication Data

US 2019/0288256 A1    Sep. 19, 2019

(30) Foreign Application Priority Data

Mar. 16, 2018  (CN) .......................... 2018 1 0220538

(51) Int. Cl.
*H01M 2/12* (2006.01)
*H01M 2/10* (2006.01)
(Continued)

(52) U.S. Cl.
CPC ....... *H01M 2/1264* (2013.01); *H01M 2/1016* (2013.01); *H01M 2/1077* (2013.01);
(Continued)

(58) Field of Classification Search
CPC .... H01M 2/1229; H01M 2/1241; H01M 2/12; H01M 2/1235
See application file for complete search history.

(56) References Cited

U.S. PATENT DOCUMENTS

| 6,649,301 | B1* | 11/2003 | Oh ....................... H01M 2/0413 |
| | | | 429/56 |
| 2011/0020675 | A1* | 1/2011 | Pei ....................... H01M 2/0408 |
| | | | 429/56 |
| 2017/0323736 | A1 | 11/2017 | Morita et al. | |

FOREIGN PATENT DOCUMENTS

| CN | 104979521 A | 10/2015 |
| CN | 105098108 A | 11/2015 |

(Continued)

OTHER PUBLICATIONS

The First Office Action for Japanese Application No. 2018-152299, dated Sep. 2, 2019, 2 pages.
(Continued)

*Primary Examiner* — Matthew J Merkling
(74) *Attorney, Agent, or Firm* — Law Offices of Liaoteng Wang

(57) ABSTRACT

The disclosure relates to a battery module comprises a housing, a battery stack, a cover plate assembly, and a guiding component. The battery stack is disposed in a containing chamber of the housing. The cover plate assembly comprises a plate, a deformable plate and a module output, the plate is arranged to close the opening, the deformable plate is connected to the plate and is deformable in a thickness direction of the plate, the module output is connected to the plate and is disposed opposite to the deformable plate, the module output and the battery stack are electrically connected. The guiding component is disposed between the cover plate assembly and the battery stack, and comprises a guiding channel and an exhaust port, and the gas released after the first vent plate is opening flows to the deformable plate through the exhaust port and the guiding channel.

10 Claims, 8 Drawing Sheets

(51) Int. Cl.
*H01M 2/20* (2006.01)
*H01M 2/34* (2006.01)
*H01M 2/04* (2006.01)

(52) U.S. Cl.
CPC ....... *H01M 2/1211* (2013.01); *H01M 2/1229* (2013.01); *H01M 2/1252* (2013.01); *H01M 2/206* (2013.01); *H01M 2/345* (2013.01); *H01M 2/0473* (2013.01); *H01M 2/12* (2013.01); *H01M 2200/20* (2013.01)

(56) References Cited

FOREIGN PATENT DOCUMENTS

| | | |
|---|---|---|
| CN | 206490102 U | 9/2017 |
| CN | 108075054 A | 5/2018 |
| EP | 3367494 A1 | 8/2018 |
| JP | 2002289159 A | 10/2002 |
| JP | 2012104471 A | 5/2012 |
| JP | 2014135247 A | 7/2014 |
| JP | 2018142540 A | 9/2018 |
| KR | 20160113888 A | 10/2016 |
| WO | WO2017106349 A1 | 6/2017 |

OTHER PUBLICATIONS

The Extended European Search Report for European Application No. 18192053.9, dated Dec. 5, 2018, 16 pages.

* cited by examiner

A

35

BATTERY MODULE

CROSS-REFERENCE TO RELATED APPLICATION

This application is based upon and claims priority to Chinese Patent Application No. 201810220538.1, filed on Mar. 16, 2018, the content of which is incorporated herein by reference in its entirety.

TECHNICAL FIELD

The present disclosure relates to the field of battery technology, and in particular, to a battery module.

BACKGROUND

Currently, in the field of power cars and energy storage power stations, it is generally necessary to use power batteries with large capacity as power sources. In addition to high capacity, these power batteries should also have good safety and long cycle life to achieve usage standards and meet people's needs. In the application process of the power battery, if it is improperly used (for example, if the battery continues to be charged after the battery is fully charged), the overcharge of the battery may cause the internal battery to generate high-pressure gas, and a fire explosion may occur.

In order to prevent the problem of fire and explosion caused by overcharging during use of a battery, the overcharge safety mechanism design is often performed on each cell, that is, a common method is to set a mechanical deformable plate on each cell, along with fuses for realizing the breaking of the battery when it is overcharged, which in turn prevents the cell from being overcharged to prevent it from catching fire or even exploding.

Use of such a structure inevitably raises a problem that the provision of such a deformable plate and a fuse in each battery not only raises the difficulty of designing the battery, but also increases the cost of the battery, and thus raises cost of the cell module formed by the single batteries.

Therefore, a new battery module is urgently needed.

SUMMARY

The embodiment of the present disclosure provides a battery module capable of preventing the battery stack from causing fire and explosion due to overcharge at the module level, and at the same time reducing the design difficulty and cost of the battery stack, thereby reducing the production cost of the battery module.

In one aspect, an embodiment of the present disclosure provides battery module characterized by comprising: a housing, comprising a containing chamber with an opening; a battery stack, disposed in the containing chamber, comprising two or more single batteries with a first vent plate and electrically connected to each other; a cover plate assembly connected to the housing, the cover plate assembly comprises a plate, a deformable plate and a module output, the plate is arranged to close the opening, the deformable plate is connected to the plate and is deformable in a thickness direction of the plate, the module output is connected to the plate and is disposed opposite to the deformable plate, the module output and the battery stack are electrically connected; a guiding component disposed between the cover plate assembly and the battery stack, and the guiding component comprises a guiding channel and an exhaust port, the guiding channel is disposed opposite to the deformable plate and the exhaust port is disposed opposite to the first vent plate, the guiding channel and the exhaust port are connected with each other; and the gas released after the first vent plate is opening flows to the deformable plate through the exhaust port and the guiding channel.

According to an aspect of an embodiment of the present disclosure, the guiding component comprises a substrate disposed in the thickness direction in a spaced manner with the plate, and the exhaust port penetrates through the substrate in the thickness direction; a first surface of the substrate facing the plate has convex ribs that protrude toward the plate, and the convex ribs are arranged around the exhaust port to form the guiding channel.

According to an aspect of an embodiment of the present disclosure, the first surface is provided with at least one guide portion adapted to any shape of said exhaust port, the guide portion comprises an inlet and an outlet connected with each other, and in the thickness direction, the height of the outlet is not higher than the height of the end surface of the convex rib away from the first surface.

According to an aspect of an embodiment of the present disclosure, the second surface of the substrate facing the battery stack is provided with a mating surface which is capable of being attached to the outer periphery of the first vent plate, the mating surface is disposed around the exhaust port.

According to an aspect of the embodiments of the present disclosure, the cover plate assembly further comprises an electrode terminal and a transitional connecting portion, the module output and the battery stack are connected through the electrode terminal, the transitional connecting portion is connected to the electrode terminal, and the deformable plate is electrically connected to the battery stack through the transitional connecting portion.

According to an aspect of an embodiment of the present disclosure, the transitional connecting portion comprises a conductive plate disposed on the plate and a resistor component electrically connected to the conductive plate, the conductive plate is disposed to face the deformable plate.

According to an aspect of an embodiment of the present disclosure, the method further comprises a fuse disposed between the plate and the battery stack, the fuse comprising a first connecting portion connected to the electrode terminal, a second connecting portion connected to the battery stack, and a fuse portion between the first connecting portion and the second connecting portion, the fuse portion and the battery stack has a gap therebetween.

According to an aspect of an embodiment of the present disclosure, the plate is provided with a recess portion that is recessed toward the battery stack in a thickness direction, and the flap is provided in the recess portion.

According to an aspect of an embodiment of the present disclosure, the plate is provided with a vent hole in the thickness direction, and a second vent plate is arranged in the vent hole.

According to an aspect of an embodiment of the present disclosure, it further comprises a protecting component connected to the plate and provided corresponding to the second vent plate, wherein the protecting component is located between the plate and the battery stack, and comprises a blocking portion disposed in a spaced manner in the thickness direction, the connecting portion connecting the plate and the blocking portion, and an air flow passage enables air flow to pass through the protection component, the orthogonal projection of the blocking portion on the plate at least partially covers the second vent plate.

BRIEF DESCRIPTION OF THE DRAWINGS

Features, advantages, and technical effects of the exemplary embodiments of the present disclosure will be described below with reference to the accompanying drawings.

Figure 1:
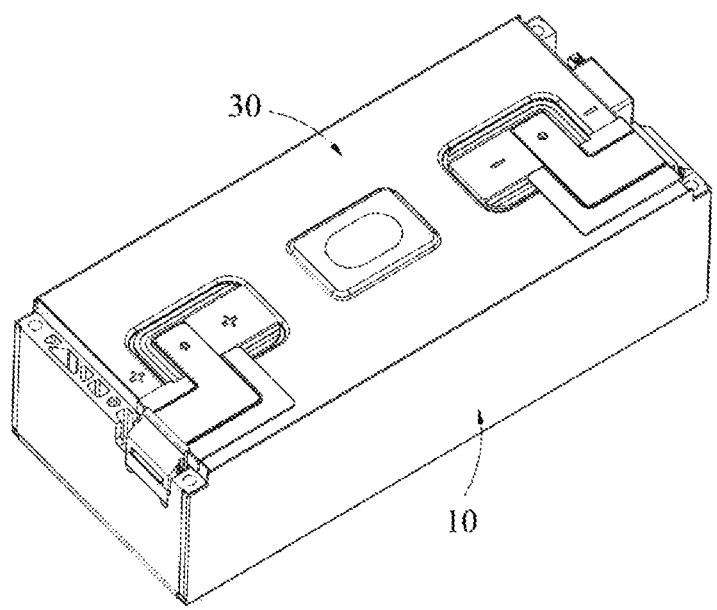
FIG. 1 is an axonometric view of a battery module according to an embodiment of the present disclosure.

Wherein:

10—housing; 11—opening; 12—containing chamber;
20—battery stack; 21—battery; 211—first vent plate; 212—plane area;
30—cover plate assembly; 31—plate; 311—recess; 312—vent hole; 313—sinking;
32—deformable plate; 321—bend; 322—circumference; 323—projection;
33—module output;
34—guide electrode column;
35—transition joint; 351—conductive plate; 352—resistor component;
36—second vent plate;
40—guiding components;
41—Substrate; 411—First surface; 412—Second surface; 413—Weight reduction groove; 414—clamping convex; 415—Adherence surface;
42—Guiding channels; 421—convex ribs; 43—Exhaust outlets; 44—Guide; 441—inlet; 442—Exit;
50—fuse; 51—first connection; 52—second connection; 53—fuse;
60—Protection member; 61—Barrier; 62—Adapter; 621—First bending portion; 622—Second bending portion; 622a—through port; 63—Air passage;
a—thickness direction; b—overcurrent direction.

In the drawings, the same components use the same reference numerals. The drawings are not drawn to actual scale.

DETAILED DESCRIPTION

The embodiments of the present disclosure will be further described in detail below with reference to the accompanying drawings and embodiments. The detailed description of the following embodiments and the accompanying drawings are used to exemplarily explain the principle of the present disclosure, but it cannot be used to limit the scope of the present disclosure, that is, the present disclosure is not limited to the described embodiments.

In the description of the present disclosure, it should be noted that unless otherwise specified, the meaning of "a number" is one or more; the meaning of "a plurality" is two or more; the terms "upper", "lower", "right", "inner", "outer", "front end", "back end", "head", "tail", etc. are orientation or positional relationship based on the orientation shown in the drawings; it is merely simplified for convenience of describing the present disclosure and simplification of the description, and does not indicate or imply that the pointed device or element must have a particular orientation, be constructed and operated in a specific orientation, and therefore should not be construed as limiting the present disclosure. Moreover, the terms "first," "second," "third," etc., are used for descriptive purposes only, and are not to be construed as indicating or implying relative importance.

The orientation words appearing in the following description are the directions shown in the drawings, and do not limit the specific structure of the battery module of the present disclosure. In the description of the present disclosure, it should also be noted that the terms "installation", "connected", and "connecting" should be interpreted broadly unless specifically defined or limited, for example, they may be fixed connections or they may be detachment or integral connection; it may be mechanical or electrical; it may be direct or indirect through intermediate media. Those of ordinary skill in the art may understand the specific meanings of the above terms in the present disclosure as the case may be.

For a better understanding of the present disclosure, a battery module according to an embodiment of the present disclosure will be described in detail below with reference to FIG. 1 to FIG. 13.

Figure 2:
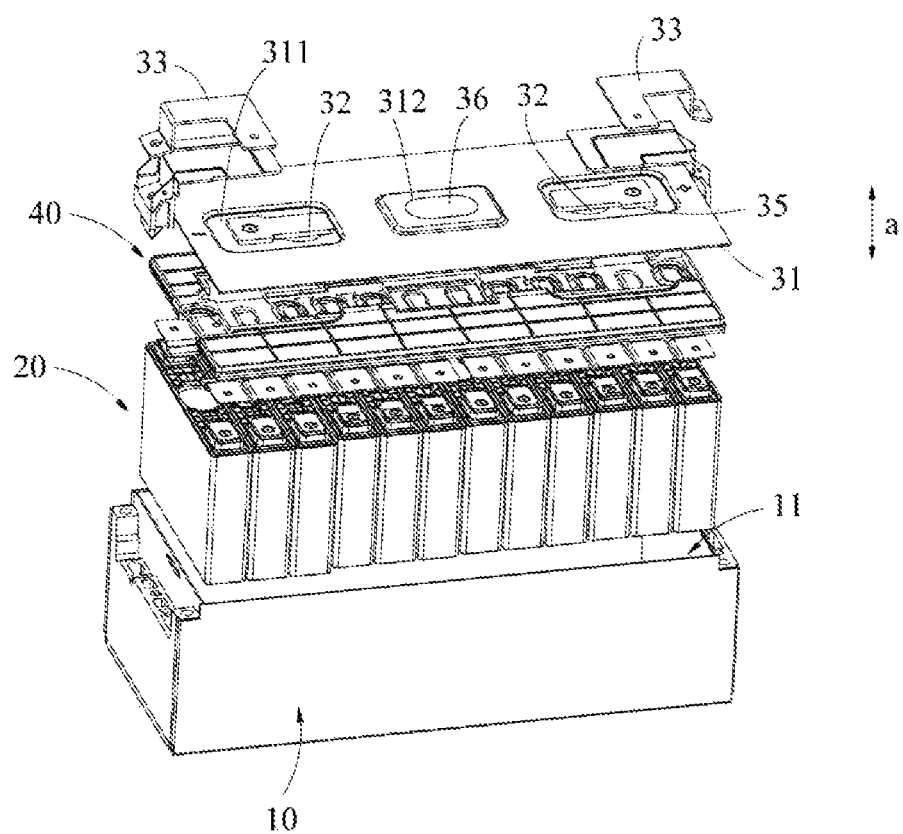
FIG. 2 is an exploded schematic view of a battery module according to an embodiment of the present disclosure.
Figure 3:
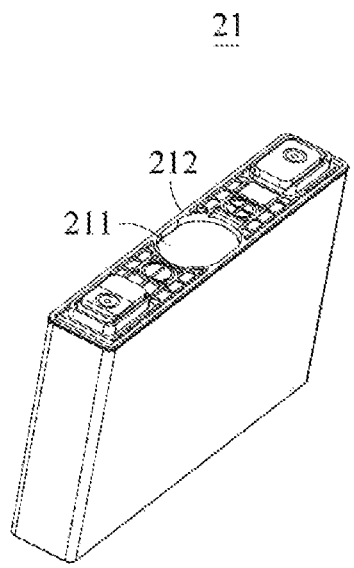
FIG. 3 is an axonometric view of a battery according to an embodiment of the present disclosure.
Figure 4:
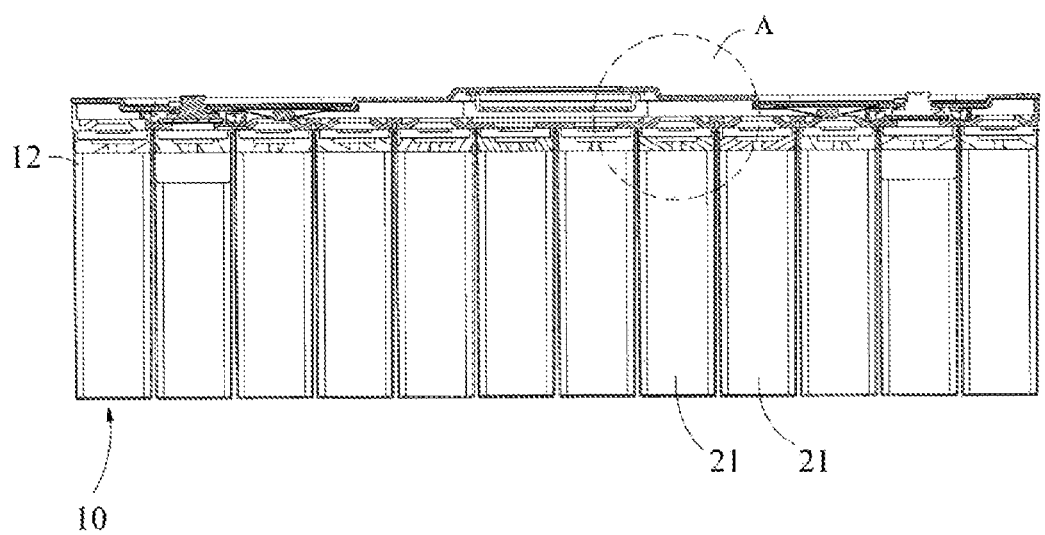
FIG. 4 is a longitudinal sectional view of a battery module according to an embodiment of the present disclosure.

Please refer to FIG. 1 to FIG. 4. FIG. 1 shows an isometric view of a battery module according to an embodiment of the present disclosure; FIG. 2 shows an exploded view of the battery module according to an embodiment of the present disclosure; FIG. 3 is an axonometric view of a battery according to an embodiment of the present disclosure FIG. 4 shows a longitudinal sectional view of a battery module according to an embodiment of the present disclosure.

An embodiment of the present disclosure provides a battery module, comprising a housing 10, a battery stack 20, a cover plate assembly 30, and a guiding component 40. The housing 10 comprises a containing chamber 12 having an opening 11 in which the battery stack 20 is disposed, and comprises two or more unit batteries 21 each having a first vent plate 211 and electrically connected to each other. The cover plate assembly 30 is connected to the housing 10. The cover plate assembly 30 comprises a plate 31 configured to close the opening 11, a deformable plate 32 connect to the plate 31 and capable of flapping in the thickness direction a of the plate 31, and a module output 33 connect to the plate 31 and set corresponding to the deformable plate 32, the module output 33 and the battery stack 20 are electrically connected to the deformable plate 32. The guiding component 40 is disposed between the cover plate assembly 30 and the battery stack 20. The guiding component 40 has a flow guiding channel 42 disposed opposite to the turning sheet 32 and an exhaust port 43 disposed opposite to the first vent plate 211. The port 43 connects with the guiding channel 42. The gas released after the explosion of the first vent plate 211 flows through the exhaust port 43 and the guiding channel 42 to the deformable plate 32.

The battery module provided by the embodiment of the present disclosure may prevent the battery from causing fire and explosion due to overcharge at the module level, and at the same time may reduce the design difficulty and cost of the battery 21 and further reduce the production cost of the battery module.

Specifically, when the housing 10 is specifically implemented, the entire body may be a square body structure, and the interior thereof is a hollow structure to form a containing chamber 12. The opening 11 is located on one surface of the housing 10 and connects with the containing chamber 12. The housing 10 may be made of aluminum alloy or other materials.

The battery stack 20 is placed in the casing 10 through the opening 11 of the casing 10. The number of the single batteries 21 included in the battery stack 20 may be set according to requirements, and more than two single batteries of the present embodiment. 21 is stacked in the longitudinal direction of the housing 10, and each cell 21 has a first vent plate 211, and the first vent plate 211 is disposed toward the opening 11. The first vent plate 211 may make the rupture disk in the first vent plate 211 be destroyed when the corresponding battery 21 generates excessive gas due to overcharging or overheating of the battery and the internal pressure of the battery 21 is excessively high. The gas formed inside the battery 21 may be discharged to the outside through the first vent plate 211, whereby the cell 21 may be prevented from catching fire or exploding. Specifically, the two or more single batteries 21 electrically connected to each other may be connected to each other in series or in parallel via electrical connection sheets.

The sectional shape of the plate 31 of the cover plate assembly 30 in the thickness direction a of the cover plate assembly 30 matches the shape of the opening 11 and is generally sheet-shaped. The plate 31 is hermetically sealed to the housing 10 by welding or the like. The material of the material may be the same as the material of the housing 10, and all of them are made of a metal conductive material such as an aluminum alloy.

The module output 33 comprises a positive output and a negative output spaced on the plate 31. Correspondingly, the number of the deformable plates 32 is two; one of the deformable plate 32 is opposite to the positive output and another deformable plate 32 is opposite to the negative output pole. Both deformable plates 32 are made of conductive material and attached to the plate 31 respectively.

Figure 5:
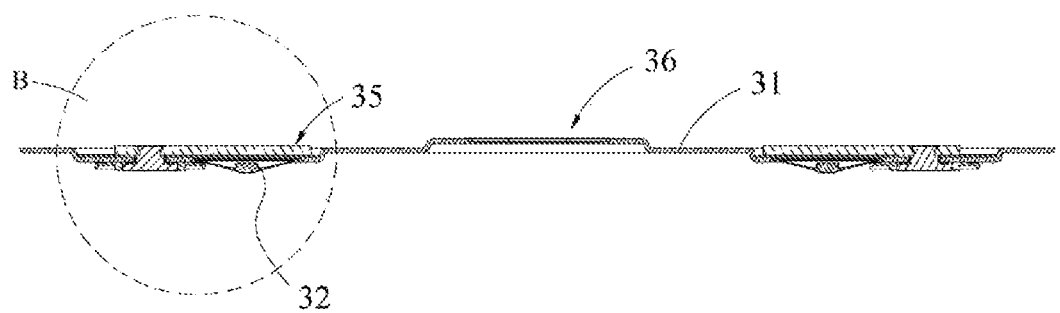
FIG. 5 is a longitudinal sectional view of a cover plate assembly according to an embodiment of the present disclosure.
Figure 6:
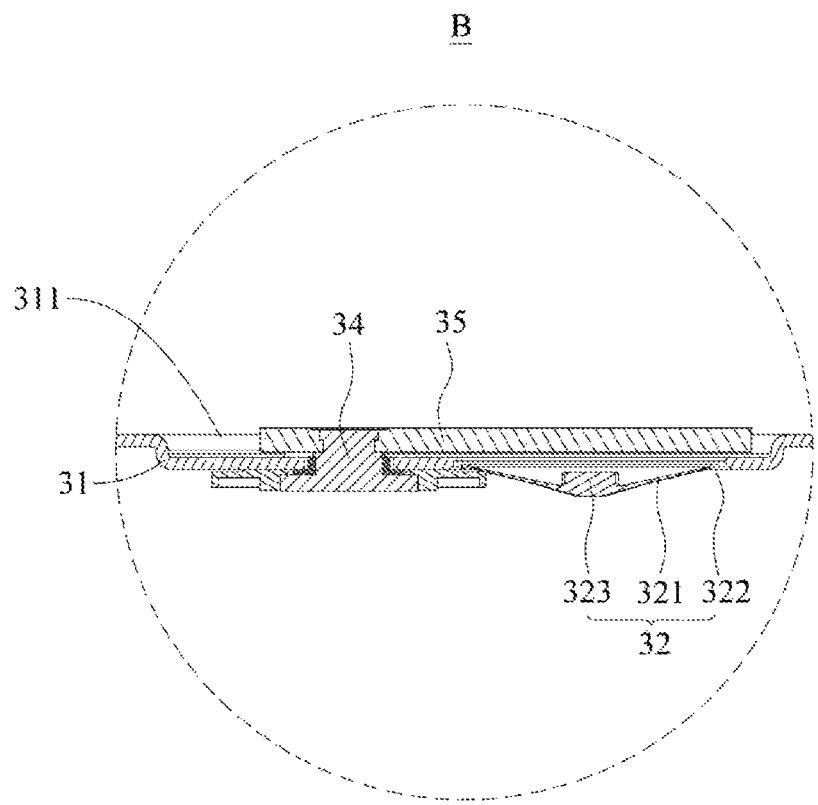
FIG. 6 is an enlarged view of B in FIG. 5.

Please refer to FIG. 5 and FIG. 6. FIG. 5 shows a longitudinal sectional view of a cover plate assembly 30 according to an embodiment of the present disclosure. FIG. 6 is an enlarged view of B in FIG. 5. Each of the deformable plates 32 has a film-like curved portion 321, a circumferential edge portion 322, and a protruding portion 323, wherein the curved portion 321 is formed in an arc shape that is convex toward the inner space of the housing 10, and the circumferential edge portion 322 is formed in the curved outside of the portion 321. A vent hole is disposed on the plate 31 and corresponding position of the deformable plate 32. The deformable plate 32 is disposed in the corresponding vent hole and is fixed by a circumferential edge portion 322 and a sidewall surrounding the vent hole. The protruding portion 323 protrudes from the substantially center position of the bent portion 321 toward the outside of the opening 11.

In some alternative embodiments, the plate 31 of the cover plate assembly 30 is provided in its own thickness direction a with a recess 311 recessed toward the battery stack 20, and the deformable plate 32 is disposed in the recess 311. In an example, since the number of flap plates 32 is two, the number of the corresponding concave portions 311 is preferably two and is arranged in one-to-one correspondence with the two deformable plates 32. In this embodiment, the concave portion 311 may be stamped on the surface of the plate 31 away from the single battery stack 20, so that the heights of the upper surfaces of the two concave portions 311 (i.e., the surfaces away from the single battery stack 20) is lower than the height of the upper surface of remaining part of the plate 31; and that the height of the lower surface of the recess 311 (i.e., the surface facing the battery stack 20) is lower than the height of the lower surface of remaining part of the plate 31.

The shapes of the two recesses 311 may be the same, and the shape thereof may be a square depression. Of course in some optional embodiments, the shapes of the two recesses 311 may also be different, and circular, elliptical or irregular shapes may be adopted.

By providing the concave portion 311 and arranging the deformable plate 32 in the concave portion 311 correspondingly, the deformable plate 32 is closer to the first vent plate 211 of the battery 21, and when the battery 21 is overcharged, after its first vent plate the 211 blasted, the generated gas may quickly reach the deformable plate 32, prompting the deformable plate 32 to be turned over quickly to form a protection circuit. Therefore, the response time of the deformable plate 32 may be shortened, so that the charging circuit may be cut off in time, and the overcharge of the battery 21 may be prevented from being caused by the excessively long duration, resulting in a fire or even an explosion.

Figure 7:
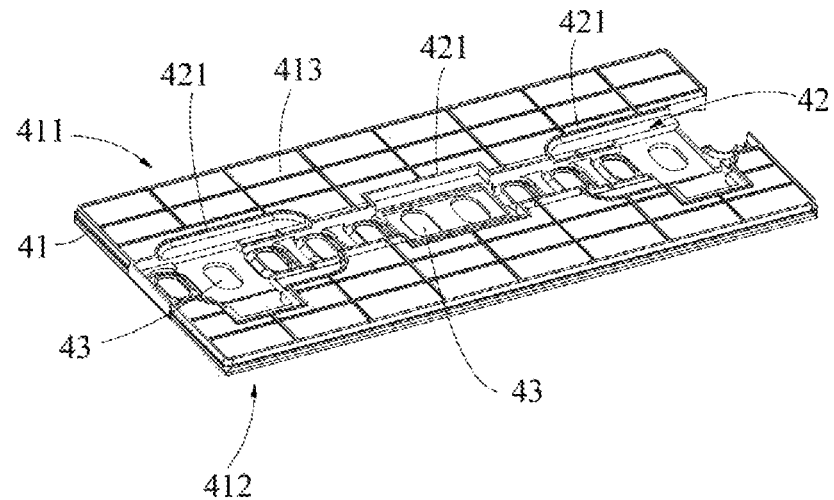
FIG. 7 is an axonometric view of a guiding component of an embodiment of the present disclosure.
Figure 8:
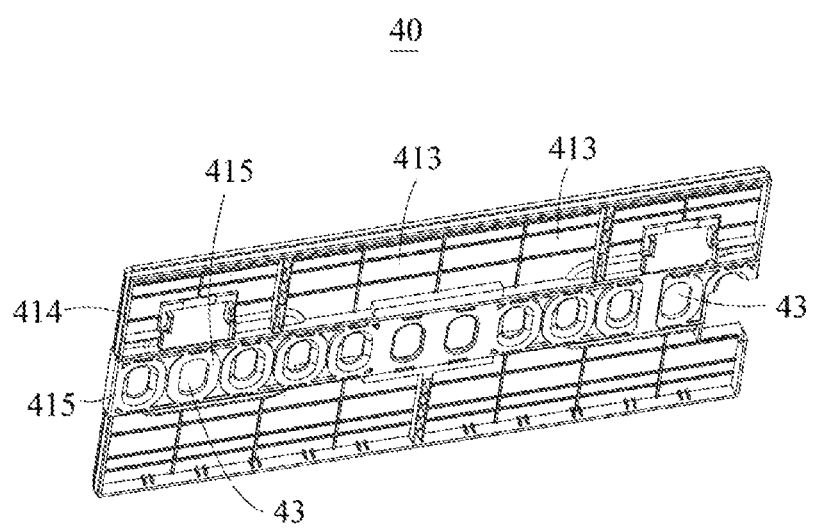
FIG. 8 is an axonometric view of another embodiment of the guiding component of the present disclosure.

Please refer to and FIG. 7 and FIG. 8. FIG. 7 shows a perspective view of the guiding component 40 according to an embodiment of the present disclosure, and FIG. 8 shows another view of the guiding component 40 according to the embodiment of the present disclosure. Axonometric drawing. Optionally, the guiding component 40 comprises a base plate 41 spaced from the plate 31 in the thickness direction a of the plate 31. The cross-sectional shape of the base plate 41 in the thickness direction a of the plate 31 matches the shape of the opening 11, and may be a square shape. Also, the cross-sectional dimension of the substrate 41 in the thickness direction a is smaller than the size of the opening 11, so that the substrate 41 may be mounted to the housing 10 from the opening 11 and between the battery stack 20 and the cap assembly 30. The base plate 41 is made of an insulating material and has a first surface 411 and a second surface 412 disposed opposite to each other in the thickness direction a of the plate 31. The first surface 411 is disposed to face the plate 31, and the second surface 412 is disposed to face the battery stack 20.

An exhaust port 43 is a vent hole 622 that penetrates the substrate 41 in the thickness direction a of the plate 31, and the shape of the exhaust port 43 matches the shape of the outer contour of the first vent plate 211 of the battery 21. The number of the exhaust ports 43 may be set according to a specific case, and is preferably the same as the number of the single batteries 21. The first vent plate 211 of each battery 21 is disposed opposite to one exhaust port 43 so that when the single batteries are overfilled causing the first vent plate 211 to be opened by blasting, the gas of each battery 21 may flow into the guiding channel 42 through the exhaust port 43. Of course in some embodiments, the number of exhaust ports 43 may be less than or more than the number of single batteries 21 according to usage requirements.

Optionally, the first surface 411 of the substrate 41 facing the plate 31 is provided with convex ribs 421 protruding toward the plate 31, and the convex ribs 421 are arranged around the exhaust port 43 to form the guiding channel 42. The cross-sectional shape of the flow guiding channel 42 in the thickness direction a of the plate 31 is ring-shaped, and the ring shape is not limited to a closed ring shape. In an embodiment, in order to avoid other parts of the battery module, the protrusion is convex. The convex ribs 421 may be partially broken in the ring direction as long as it presents in a ring shape as a whole to ensure the guiding action of the gas. In an embodiment, the convex ribs 421 are arranged around the exhaust port 43, preferably around all the exhaust ports 43, so that the gas discharged from the exhaust port 43 may be collected to the guiding channel 42.

As an optional implementation, the end surface of the rib 421 away from the first surface 411 and the plate 31 of the cover plate assembly 30 abut against each other. Further, in order to better ensure the flapping of the deformable plate 32, end surface of the rib 421 that is far away from the first surface 411 and the cover plate assembly 30 may be sealed and connected by glueing or welding.

The shape of the guiding channel 42 formed by the convex ribs 421 around the exhaust port 43 may be set according to a specific situation, and may be composed of channel units arranged at intervals in the length direction of the plate 31 and connected with each other. Of course, in case that it is acceptable for space, the entire cross-section may be the same in the longitudinal direction of the plate 31.

Through the arrangement of the guiding channel 42, the gas discharged from the first vent plate 211 of the battery 21 flows directly through the exhaust port 43 to the guiding channel 42, and collects within the guiding channel 42 when the guiding channel 42 is inside. When the air pressure reaches the preset pressure value, flapping of the deformable plate 32 may be realized to ensure the safety performance of the battery module. Through the flow guiding channel 42, the multi-directional conduction of the gas blown out from the first vent plate 211 may be avoided, and the turning sheet 32 may be quickly responded and turned over to avoid damage to the battery module.

In order to reduce the weight of the guiding component 40 and increase the energy density of the battery module, it is preferable to provide a weight reduction groove 413 on both the first surface 411 and the second surface 412 of the substrate 41, and for better and single batteries. The pack 20 is connected. Optionally, on the second surface 412, a plurality of snap projections 414 are arranged around the substrate 41. The snap projections 414 are arranged along the circumferential direction of the substrate 41 so as to form snap slot that matches the shape of the battery stack 20. The snap projections connected to the battery stack 20 through the snap slot, so that the first vent plate 211 of the battery 21 is disposed correspondingly to the corresponding exhaust port 43, and buckling is less likely to occur.

Figure 9:
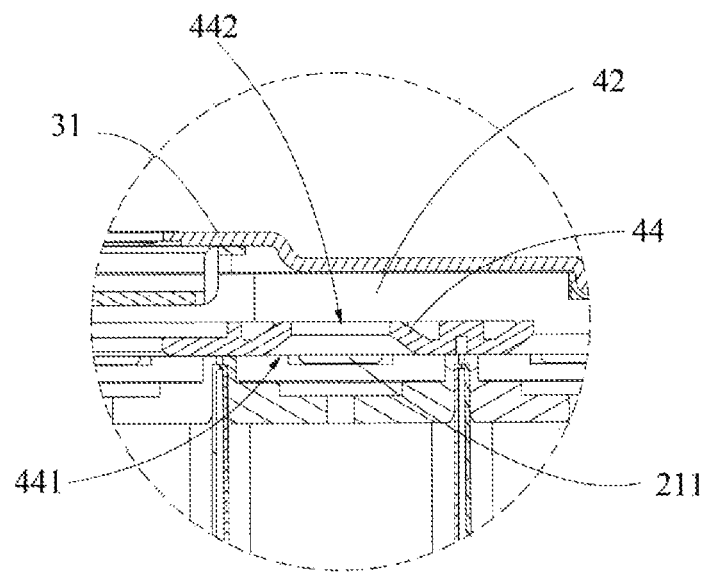
FIG. 9 is an enlarged view of A in FIG. 4.

Please refer to FIG. 9, which is an enlarged view of A in FIG. 4. As an alternative embodiment, in order to better guide the gas generated after the explosion of the first vent plate 211 of the battery 21 into the guiding channel 42, at least one guide portion 44 whose shape matches any of the air ports 43 is arranged on the first surface 411. The guide portion 44 comprises an inlet 441 and an outlet 442 communicating with each other, and the inlet 441 connects with the exhaust port 43. The height of the outlet 442 is not high in the thickness direction a of the plate 31. In the thickness direction a of the plate 31, the height of the outlet 442 is lower than the height of the end surface of the rib 421 away from the first surface 411, or at the same height of the end surface of the rib 421 away from the first surface 411. That is, it is preferable that the height of the convex ribs 421 forming the flow guiding channel 42 is highest on the base plate 41 of the guiding component 40, so that the cover plate may be away from the end surface of the rib 421 away from the first surface 411 when the cover plate covers the opening 11 of the housing 10. The close fitting ensures the guiding action of the air flow and better ensures that the deformable plate 32 is flapped under a predetermined pressure value, thereby ensuring safety of the battery module.

Preferably, each exhaust port 43 is correspondingly provided with a guide portion 44. The inlet 441 of the guide portion 44 may be connected with the end of the exhaust port 43 located at the first surface 411. Of course, in one example, the inlet 411 of the exhaust port 43 is provided, the inlet 41 may extend into the interior of the corresponding exhaust port 43 and interconnect with a wall surface surrounding the exhaust port 43. As an alternative embodiment, in order to further improve the guiding effect on the gas, it is preferable that the size of the outlet 442 of the guide portion 44 is smaller than the size of the inlet 441 of the guide portion 44, so as to have a better guiding and gathering effect on the gas.

As shown in FIG. 3 and FIG. 8, as an alternative embodiment, in order to make the gas generated after the explosion of the first vent plate 211 of the battery 21 be directly transmitted to the flow guiding channel 42, the second surface 412 of the substrate 41 facing the battery pack 20 is provided with a mating surface 415, the mating surface 415 may be attached to the outer periphery of the deformable plate 32, and is disposed around the outlet 43. The width of the mating surface 415 is preferably any value between 1 mm-5 mm, comprising both ends of 1 mm and 5 mm, and is preferably 2 mm. A mating surface 415 is provided on the second surface 412 corresponding to the first vent plate 211 of each battery 21. Correspondingly, on the outer periphery of the first vent plate 211 of each battery 21, a planar area 212 having a width corresponding to the width of the corresponding abutment surface 415 is arranged, and the planar area 212 is attached to the corresponding abutment surface 415 so that the battery stack 20 fits tightly with the base plate 41 of the guiding component 40, thereby ensuring the guiding effect of the guiding component 40 on the gas.

In order to better achieve the electrical connection between the module output 33 and the battery stack 20, as an alternative embodiment, as shown in FIG. 6, the cover plate assembly 30 further comprises an electrode terminal 34 and a transitional connection part 35. The output 33 of the module is electrically connected to the battery pack 20 via the electrode terminal 34. The transitional connection part 35 is connected to the electrode terminal 34. When the deformable plate 32 is flapped, the transitional connection part 35 is electrically connected to the battery pack 20.

Since the output 33 of the module is located on the surface of the plate 31 away from the battery stack 20, the correspondingly arranged guide electrode column 34 may facilitate the electrical connection between the module output 33 and the battery stack 20. For better electrical connection with the battery pack 20, the guide electrode column 34 is a columnar structure that penetrates the plate 31 in the thickness direction a of the plate 31. One end of the guide electrode column 34 is electrically connected to the corresponding module output 33, and the other end is electrically connected to the battery stack 20.

Figure 10:
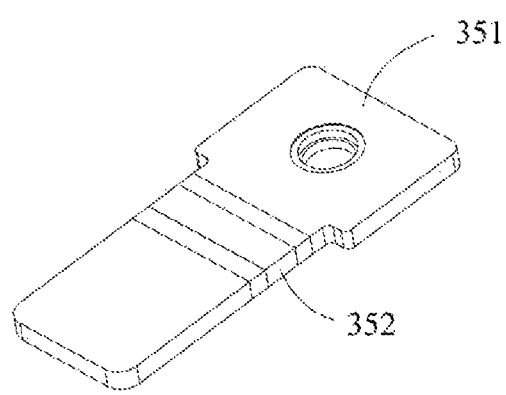
FIG. 10 is a schematic structural diagram of a transitional connecting portion according to an embodiment of the present disclosure.

Please also refer to FIG. 10, FIG. 10 shows a schematic structural diagram of a transitional connecting portion 35 according to an embodiment of the present disclosure.

Optionally, the transitional connecting portion 35 comprises a conductive plate 351 disposed on the plate 31 and a resistance block 352 electrically connected to the conductive plate 351. The conductive plate 351 is disposed facing the inverting plate 32. The conductive plate 351 preferably has a certain degree of certainty. The thickness of the plate-like structure is made of a metal material such as an aluminum material. One end of the conductive plate 351 in the longitudinal direction is connected to the electrode terminal 34, and the conductive plate 351 may be provided in the hole of the electrode terminal 34, and the other end in the longitudinal direction. The resistor is connected to the resistor component 352. The resistor component 352 may be a separate structure from the conductive plate 351 and may be connected to each other via a conductor. Of course, as an alternative embodiment, the resistor component 352 is preferably embedded in the conductive plate 351; and the conductive plate 351 constitutes a one-sheet structure. During practical implementation, an insulating member is disposed between the electrode terminal 34 and the transitional connection part 35 and the plate 31 of the cover plate assembly 30 to achieve insulation.

Since the pressure generated by the explosion of the first vent plate 211 of the battery 21 may be conducted to the underside of the deformable plate 32 in a concentrated manner through the guiding channel 42, flapping of the deformable plate 32 is realized. After the deformable plate 32 is flapped, the single battery stack 20, the electrode terminal 34, the resistance block 352, the deformable plate 32, and the plate 31 of the cover plate assembly 30 constitute a short circuit. As described above, since the short-circuit loop of the module cover plate and the battery stack 20 is formed by the deformable plate 32 after flapping, the current of the short circuit cannot perform blowing for the contact position between the deformable plate 32 after flapping and the conductive plate 351, otherwise the external circuit will continue to charge the cell 20 continuously. Therefore, the current of the short circuit loop needs to be reduced, and a resistor component 352 is serially connected to the conductive plate 351 so that the current in the short circuit of the deformable plate 32 may be reduced, effectively preventing the deformable plate 32 from turning over and the conductive plate 351 effectively; the formed contact position is blown, thereby further ensuring the safety of the battery module.

Since the deformable plate 32 is disposed in the corresponding concave portion 311, in practical implementation, the conductive plate 351, the resistance block 352, and the like of the transitional connecting portion 35 may also be correspondingly disposed in the concave portion 311, so that when the deformable plate 32 is flapped there could be mutual connection, and then safety of the battery module would be ensured.

Figure 11:
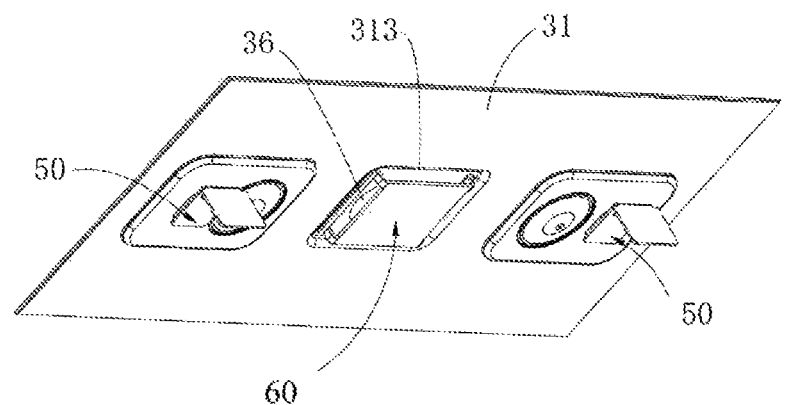
FIG. 11 is an axonometric view of a cover plate assembly, a fuse, and a protecting portion in accordance with an embodiment of the present disclosure.
Figure 12:
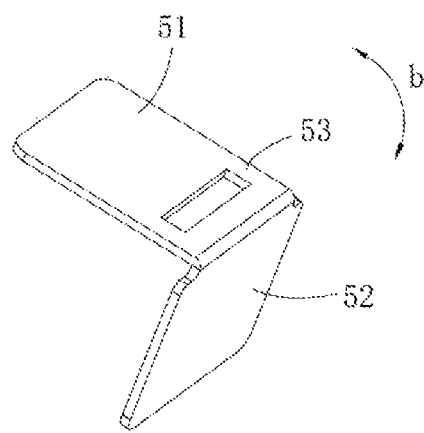
FIG. 12 is an isometric view of a fuse of an embodiment of the present disclosure.

Please refer to FIG. 11 and FIG. 12. FIG. 11 shows an isometric view of the cover plate assembly 30 and the fuse 50 and the shielding member 60 of the embodiment of the present disclosure. FIG. 12 shows an isometric view of the fuse 50 of the embodiment of the present disclosure.

As an alternative embodiment, the battery module further comprises a fuse 50 disposed between the plate 31 and the battery pack 20, and the fuse 50 comprises a first connecting portion 51 connected with the conductive electrode post 34, a second connecting portion 52 to which the single battery stack 20 is connected, and a fuse portion 53 between the first connecting portion 51 and the second connecting portion 52, the fuse portion 53 has gaps between the fuse portion 53 and the battery pack 20. That is, the battery stack 20 is connected to the module output 33 through the fuse 50 and the electrode terminal 34. When the battery stack 21 flaps the deformable plate 32, the battery stack 20 and the fuse 50, the electrode terminal 34, the resistance block 352, the deformable plate 32, and the plate 31 of the cover plate assembly 30 constitute a short circuit. Since there is a very large current in the circuit, such a large short-circuit current will blow the circuit. The device 50 is blown to cut off the short circuit, which not only prevents the discharge of the battery stack 20 on the short circuit, but also prevents the external charging power source from continuing to charge the battery 21 otherwise caused.

As an alternative embodiment, the overcurrent section of the fuse portion 53 is smaller than the overcurrent section of the first connecting portion 51 and the second connecting portion 52, so that the fuse portion 53 of the fuse 50 will be pre-fused when overcharge of the battery 21 occurs. At the same time, since there is a gap between the fuse portion 53 and the battery stack 20, there is time period during which liquid metal formed by fusing of the fuse 53 portion is cooled during dripping onto the battery 21. Thus when dripping onto the battery 21, temperature of the liquid metal is reduced, it is avoided that the high-temperature liquid metal directly drips on the battery 21 to cause accidents such as fire or explosion of some of the single batteries 21 or even the battery module. The over-current section refers to the cross-section of each portion of the fuse 50 in the overcurrent direction b in FIG. 12.

The gap value between the fuse portion 53 and the battery stack 20 may be set according to the model of the battery module, considering the cooling time requirement of the liquid metal and the energy density requirement of the battery module, as an optional implementation, the gap between the fuse portion 53 and the cell stack 20 is preferably any value between 1 mm and 20 mm, comprising both end values 1 mm and 20 mm. Based on the above considerations, the gap distance is further preferably any value between 3 mm and 8 mm, and more preferably 5 mm, that is, it may better meet the cooling requirement of the liquid metal, and at the same time it has less influence on the energy density of the battery module.

In practical implementation, in order to facilitate the electrical connection between the fuse 50 and the battery stack 20, it is preferable that a relief notch is provided on the substrate 41 of the guiding component 40 for the fuse 50 to penetrate.

As an alternative embodiment, the plate 31 is provided with a vent hole 312 in the thickness direction a, and the vent hole 312 is provided with a second vent plate 36. By setting the second vent plate 36, when an overcharge occurs in the battery 21, the second vent plate 36 can be opened when a predetermined pressure value is reached inside the battery module, and the gas inside the battery module is discharged, et 32 is not flapped due to other reasons, or the connecting position of the deformable plate 32 and the conductive sheet 351 is blown causing the battery 21 to continue overcharging, thereby further ensuring the safety of the battery module.

Figure 13:
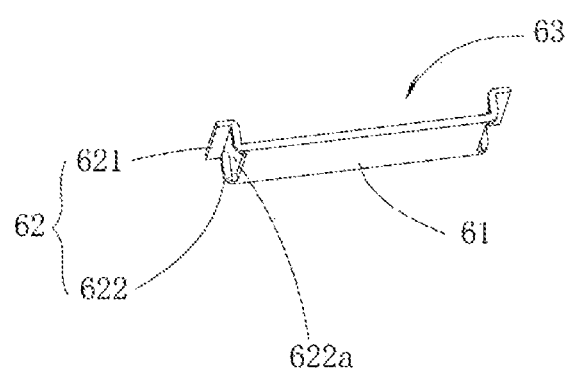
FIG. 13 is an axonometric view of a protecting portion of an embodiment of the present disclosure.

Please refer to FIG. 11 and FIG. 13. FIG. 13 shows an axonometric view of a protecting portion 60 according to an embodiment of the present disclosure. Since the second vent plate 36 is disposed on the plate 30, and the first vent plate 211 of the battery group 20 is disposed facing the plate 30, after the first vent plate 211 of the battery 21 is opened, if the second vent plate 36 of the battery module is being injected directly by the first vent plate 211, it is possible to directly open the second vent plate 36 of the module and exhaust gas.

At this time, the air pressure inside the battery module cannot be accumulated, and thus the deformable plate 32 on the battery module cannot be flapped based on the pressure generated by releasing the gas after the explosion of the first vent plate 211 of the body battery 21, and the overcharge of the battery 21 in the battery module continues to occur, thereby causing accidents such as fire and explosion.

Therefore, as an optional implementation, the battery module further comprises a protection component 60 connected to the plate 31 and corresponding to the second vent plate 36. The protection component 60 is located between the plate 31 and the battery group 20, and comprises a blocking portion 61, a connecting portion 62, and an air flow passage 63; the blocking portion 61 is disposed in a spaced manner in the thickness direction a of the plate 31, the connecting portion 62 connects the plate 31 and the blocking portion 61, and the air flow passage 63 enables air flow to pass through the protection component 60. The orthogonal projection of the blocking portion 61 on the plate 31 at least partially covers the second vent plate 36, and preferably completely covers the second vent plate 36. With the above arrangement, the protection portion 61 may block the direct impact of the gas after the explosion of the first vent plate 211 of the battery 21, and therefore, the second vent plate 36 is not affected by the first vent plate 211 of the battery 21. This will ensure the safety of the battery module.

The blocking portion 61 of the protection component 60 is a plate structure body, and the air guiding channel 63 is formed between the blocking portion 61 and the plate 31. Specifically, in this embodiment, the blocking portion 61 is preferably in the thickness direction a of the plate 31, the cross-section is rectangular, and the connecting portion 62 is a plate-like structure formed by bending both end portions of the blocking portion 61 in the longitudinal direction, and no connection is provided between the both end surfaces of the stopper portion 61 in the width direction and the plate 31; the structure therefore forms the air flow passage 63, so that when the second vent plate 36 is opened, the outside of the guard member 60 may connect with the vent hole 312. Thus the pressure inside the battery module reaches a preset pressure value, and the second vent plate 36 is opened, ensuring safety of the battery module.

In order to ensure connection strength between the protection component 60 and the plate 31, as an optional embodiment, the connecting portion 62 preferably comprises a first bend portions 621 and a second bend portions 622 set in an interesting manner. The connecting portion 62 is connected to the plate 31 via the first bending portion 621, and is connected to the blocking portion 61 via the second bending portion 622. In one example, since the adapter portion 62 is a plate-like structure body formed by bending two end portions of the blocking portion 61 in the length direction, the first bending portion 621 and the second bending portion 622 are both in plate structure. The connecting portion 62 adopts the above-mentioned form, thus when connected with the plate 31, the contact area with the plate 31 may be increased to ensure the connection strength between the two. The first bending portion 621 and the plate 31 may be fixed by welding, bonding, etc. Certainly, in some examples, a slot may also be disposed on the plate 31, and the first bending portion 621 at both ends of the adapting portion 62 may be snapped into the slot of the plate 31 to implement dismountable connection between the protection component 60 and the plate 31. The detachable connection of the plate 31 makes it easy to replace the protection portion when it is damaged, and better guarantees safety and reliability of the security cover plate when applied to the battery module. Because the whole plate 31 does not need to be replaced, so the cost may be saved.

As an optional embodiment, the thickness of the barrier portion 61 in the thickness direction a of the plate 31 is any value between 0.2 mm and 5 mm, comprising two end values of 0.2 mm and 5 mm. The blocking portion 61 adopts the above thickness, thus not only the impact force of the airflow on the second vent plate 36 when the first vent plate 211 from the battery 21 is opened, but also weight and the space of the barrier portion 61 are reduced, thus it may save the cost, and may improve energy density of the battery module.

In order to ensure that the blocking portion 61 of the protection portion 60 is able to resist the air flow impact force when the first vent plate 211 of the battery 21 is opened, and to ensure the connection strength between the blocking portion 61 and the plate 31, as an optional implementation, by way of example, the second bending portion 622 of the connecting portion 62 is further provided with a vent hole 622 that connects with the air guiding channel 63. When the safety cover plate is applied to the battery module, airflow may enter the air guiding channel 63 from multiple directions and discharge the battery module when the second vent plate 36 is opened, so as to better ensure safety of the battery module. The arrangement of the port 622a may also effectively reduce weight of the security cover plate, thereby increasing energy density of the battery module.

As an alternative embodiment, in the thickness direction a of the plate 31, the plate 31 has a sinking portion 313 recessed towards a direction away from the battery stack 20, and the protection portion 60 is connected to the sinking portion 313. By the above configuration, when applied to the box of the battery module, the plate 31 is enabled to reduce the space occupied by the protection portion 60 inside the battery module, the installation of other components of the battery module may be facilitated, and energy density of the battery module may also be improved.

Therefore, the battery module provided by embodiments of the present disclosure comprises a housing 10, a battery stack 20, a cover plate assembly 30, and a guiding component 40. When the battery 21 is overcharged, thus makes its first vent plate 211 to be open, the released gas may be transferred to the deformable plate 32 via the exhaust port 43 and the guiding channel 42 of the guiding component 40. When the air pressure reaches a predetermined air pressure, the deformable plate 32 is flapped and electrically connected to the module output 33. The short circuit of the battery stack 20 prevents the battery stack 21 from being overcharged and causes fire and explosion, thereby ensuring the safety of the battery module. Since the deformable plate 32 only needs to be provided on the cover plate assembly 30, the design difficulty and cost of the single-battery 21 may be reduced, thereby reducing production cost of the battery module and being easy to promote and use.

Although the present disclosure has been described with reference to the preferred embodiments, various modifications may be made thereto without departing from the scope of the present disclosure and the components thereof may be replaced with equivalents. In particular, as long as there is no structural conflict, the various technical features mentioned in the various embodiments may be combined in any manner. The present disclosure is not limited to the specific embodiments disclosed herein, but comprises all technical solutions that fall within the scope of the claims.

What is claimed is:

1. A battery module, comprising:
    a housing, comprising a containing chamber with an opening;
    a battery stack, disposed in the containing chamber and comprising two or more single batteries with a first vent plate and electrically connected to each other;
    a cover plate assembly connected to the housing, wherein the cover plate assembly comprises a plate, a deformable plate and a module output, the plate is arranged to close the opening, the deformable plate is connected to the plate and is deformable in a thickness direction of the plate, the module output is connected to the plate and is disposed opposite to the deformable plate, the module output and the battery stack are electrically connected;
    a guiding component disposed between the cover plate assembly and the battery stack, wherein the guiding component comprises a guiding channel and an exhaust port, the guiding channel is disposed opposite to the deformable plate and the exhaust port is disposed opposite to the first vent plate, the guiding channel and the exhaust port are connected with each other, and the gas released after the first vent plate is opened flows to the deformable plate through the exhaust port and the guiding channel.

2. The battery module according to claim 1, wherein the guiding component comprises a substrate disposed in the thickness direction in a spaced manner with the plate, and the exhaust port penetrates through the substrate in the thickness direction, a first surface of the substrate facing the plate has convex ribs that protrude toward the plate, and the convex ribs are arranged around the exhaust port to form the guiding channel.

3. The battery module according to claim 2, wherein the first surface is provided with at least one guide portion adapted to any shape of the exhaust port, the guide portion comprises an inlet and an outlet connected with each other, and in the thickness direction, the height of the outlet is not higher than the height of the end surface of the convex rib away from the first surface.

4. The battery module according to claim 2, wherein second surface of the substrate facing the battery stack is provided with a mating surface which is capable of being attached to the outer periphery of the first vent plate, the mating surface is disposed around the exhaust port.

5. The battery module according to claim 1, wherein the cover plate assembly further comprises an electrode terminal and a transitional connecting portion, the module output and the battery stack are connected through the electrode terminal, the transitional connecting portion is connected to the electrode terminal, and the deformable plate is electrically connected to the battery stack through the transitional connecting portion when the deformable plate is deformable.

6. The battery module according to claim 5, wherein the transitional connecting portion comprises a conductive plate disposed on the plate and a resistor component electrically connected to the conductive plate, the conductive plate is disposed to face the deformable plate.

7. The battery module according to claim 5, wherein the cover plate assembly further comprises a fuse disposed between the plate and the battery stack, the fuse comprising a first connecting portion connected to the electrode terminal, a second connecting portion connected to the battery stack, and a fuse portion between the first connecting portion and the second connecting portion, wherein the fuse portion and the battery stack has a gap therebetween.

8. The battery module according to claim 1, wherein the plate is provided with a recess recessed towards the battery stack in the thickness direction, and the deformable plate is disposed in the recess.

9. The battery module according to claim 1, wherein the plate is provided with a vent hole in the thickness direction, and a second vent plate is arranged in the vent hole.

10. The battery module according to claim 9, wherein the cover plate assembly further comprises a protecting component connected to the plate and provided corresponding to the second vent plate, wherein the protecting component is located between the plate and the battery stack, and the protecting component comprises a blocking portion disposed in a spaced manner with the plate in the thickness direction, the connecting portion connecting the plate and the blocking portion, and an air flow passage enabling air flow to pass through the protection component, wherein the orthogonal projection of the blocking portion on the plate at least partially covers the second vent plate.

* * * * *